Dec. 8, 1959   H. TIDWELL   2,916,070
FRUIT PICKER'S RECEPTACLE
Filed Oct. 1, 1958   2 Sheets-Sheet 1
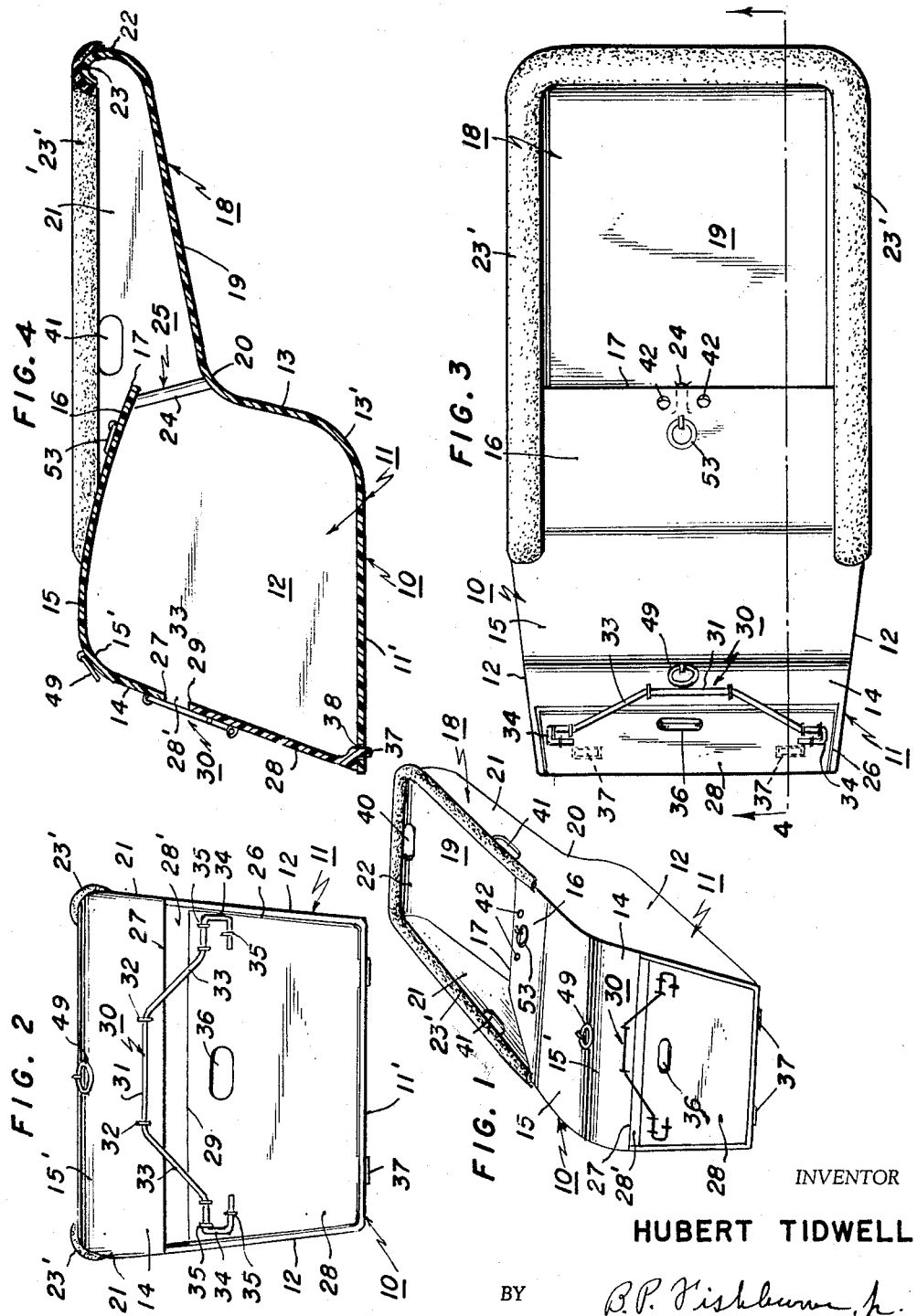
INVENTOR
HUBERT TIDWELL
BY
ATTORNEY Dec. 8, 1959  H. TIDWELL  2,916,070
FRUIT PICKER'S RECEPTACLE
Filed Oct. 1, 1958  2 Sheets-Sheet 2
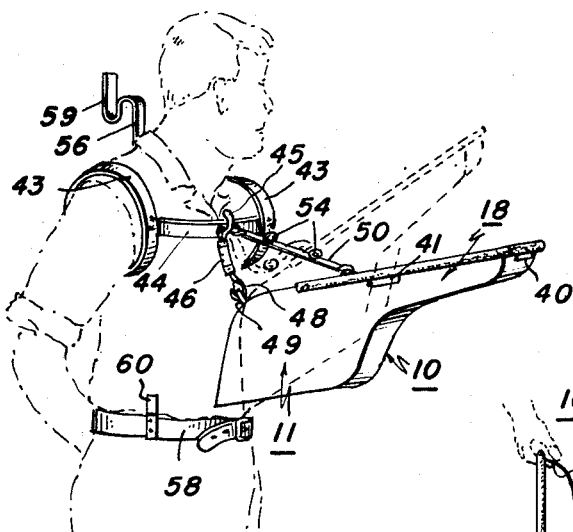
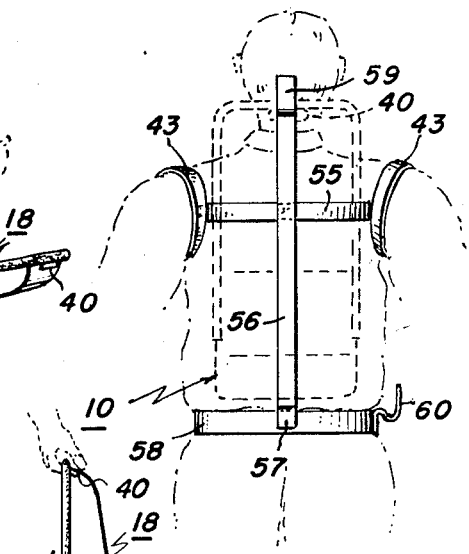
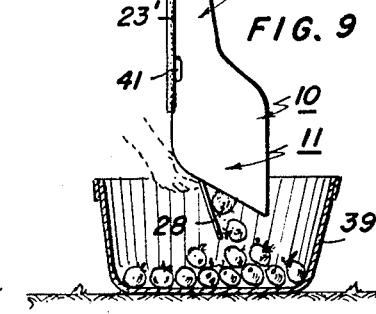
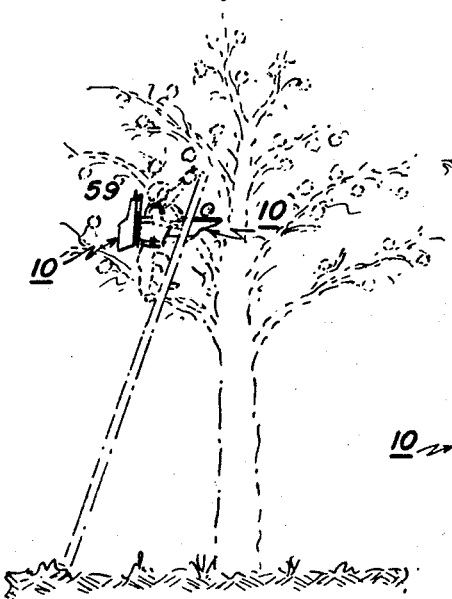
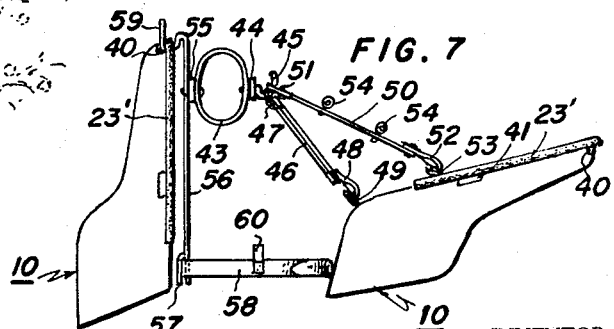
INVENTOR
HUBERT TIDWELL
BY
ATTORNEY

United States Patent Office 2,916,070
Patented Dec. 8, 1959

2,916,070

FRUIT PICKER'S RECEPTACLE

Hubert Tidwell, Washington, D.C.

Application October 1, 1958, Serial No. 764,637

7 Claims. (Cl. 150—2)

The present invention relates to a receptacle for fruit pickers.

A primary object of the invention is to provide an improved receptacle for use by fruit pickers when harvesting tree fruit and the like.

A further important object of the invention is to provide a receptacle of the above-mentioned character, the use of which will prevent damaging or bruising the fruit such as apples during the picking of the same.

A further object of the invention is to provide a receptacle of the above-mentioned character which is substantially spill-proof, and adapted to hold the fruit from the time that it is picked and deposited into the receptacle, until the fruit is dumped from the receptacle into a field box or crate.

Another object is to provide a fruit picking receptacle of the above-mentioned character, having a novel dump door or gate which is operable with one hand to facilitate emptying out the fruit from the receptacle into a field box or crate without bruising the fruit.

Another object of the invention is to provide a receptacle of the above-mentioned character which will enable the fruit picker to harvest the fruit rapidly and efficiently and with a minimum of fatigue and manual labor, due to the construction of the receptacle and the manner in which the same is mounted upon the supporting body harness.

A further and more specific object of the invention is to provide a fruit picker's receptacle which is adjustable as to height during use, and so constructed that the picker may carry a spare receptacle upon his back and utilize the same after the first receptacle is filled, without the necessity for first descending from the ladder or the like or discontinuing the picking of fruit.

Still another object of the invention is to provide a fruit picker's receptacle which extends a substantial distance forwardly of the body during use, permitting the fruit to be dropped into the receptacle immediately after it is picked, rather than necessitating the picker transferring the fruit inwardly toward the body a substantial distance, and thereby saving time, as well as labor and fatigue.

Other objects and advantages of the invention will become apparent during the course of the following detailed description.

In the accompanying drawings, forming a part of this application and in which like numerals are employed to designate like parts throughout the same, Figure 1 is a perspective view of a fruit picker's receptacle according to the invention.

Figure 2 is a rear end elevation of the same.

Figure 3 is a plan view of the receptacle.

Figure 4 is a longitudinal vertical section taken on line 4—4 of Figure 3.

Figure 5 is a perspective view of the receptacle and body harness in use.

Figure 6 is a rear elevation showing a spare receptacle mounted upon the back of the body harness.

Figure 7 is a perspective view of the body harness alone.

Figure 8 is a perspective view further illustrating the use of the device for picking tree fruit.

Figure 9 is a side elevation of the receptacle showing the manner of depositing the picked fruit into a field box or crate.

In the drawings, wherein for the purpose of illustration is shown a preferred embodiment of the invention, the numeral 10 designates a fruit picker's receptacle as a whole, which receptacle is preferably formed of molded plastics material, or the like, although if preferred, sheet metal or some other suitable material which is sufficiently strong and light may be employed.

The receptacle 10, as shown in the drawings, comprises a generally rectangular box-like body portion, preferably of a size to hold approximately one-half bushel of apples or the like. The box-like body portion 11 comprises a bottom wall 11' and side walls 12 integrally joined therewith and extending above the same generally vertically in spaced somewhat upwardly divergent relation. The bottom wall 11' is generally horizontal in use. The body portion 10 further comprises a relatively short generally vertical and somewhat forwardly inclined forward wall 13 integral with the side walls 12 and bottom wall 11', and joined to the bottom wall by a rounded wall portion 13'. The body portion also includes a rear generally vertical and somewhat forwardly inclined wall 14, integrally connected with the side walls 12 and substantially parallel to the forward wall 13. A top relatively short substantially horizontal wall portion 15 is connected with the rear wall 14 by an upper rounded wall portion 15', and the top wall 15 is also integrally connected with the side walls 12 of body portion 10. The top wall of the body portion 10 further includes a forward downwardly sloping wall portion 16, having a leading transverse edge 17 terminating in substantial vertical alignment with the forward wall 13 and spaced above the rounded wall portion 20 as best shown in Figure 4.

The receptacle 10 further comprises an elongated forwardly extending chute 18, integral with the body portion 10 and having its top open and being rectangular as viewed from the top in Figure 3. The chute 18 embodies a rearwardly and downwardly inclined bottom wall 19 which is transversely flat and of a width equal to the full width of the body portion 10. The bottom wall 19 of the chute is joined with the forward wall 13 of body portion 10 by a smoothly rounded wall portion or shoulder 20, spaced below the edge 17, as previously stated. The chute 18 further comprises relatively low forwardly tapering vertical side walls 21 integral with and forming extensions of the body portion side walls 12. The chute 18 also has a relatively low generally vertical and preferably rounded transverse forward wall 22 formed integral with the bottom wall 19 and side walls 21, and terminating at its upper end in a rearwardly curved flange or lip 23, which flange may continue along the upper edges of the side walls 21, throughout their entire lengths, as shown. The upper edges of the chute side walls 21 are horizontal and are at the elevation of the horizontal top wall portion 15, as shown in the drawings.

In order to protect the fruit from possible bruising during placement of the same into the chute 18, I prefer to pad the upper face of the flange 23 with sponge rubber, felt or the like, as indicated at 23' in the drawings. The pad 23' may be secured to the flange 23 with suitable glue or cement.

To add strength to the receptacle, a generally vertical brace 24 extends between the forward end of the inclined wall portion 16 and the rounded shoulder 20, at the transverse center of the receptacle, as shown.

It may now be seen that a relatively restricted passage 25 extending for the entire width of the receptacle is provided between the leading edge 17 of inclined wall portion 16 and the shoulder 20 at the junction of the chute 18 and wall 13. This passage 25 is deep enough to permit the largest size fruit to roll from the inclined bottom wall 19 of the chute into the receptacle body portion 11 without striking the upper wall portion 16, which wall portion projects forwardly and downwardly into the rear deeper end portion of the forwardly tapering chute, as best shown in Figure 4. The leading edge 17 of inclined wall portion 16 is spaced considerably below the open top of the chute 18.

The rear wall 14 of the receptacle body portion is provided with a large generally rectangular opening 26, extending for the full width of the body portion between the side walls 12 and from the bottom wall 11' upwardly to a point well above the vertical center of the body portion, and defining a lower transverse edge 27 upon the rear wall 14. The opening 26 is normally covered by a large rectangular door 28, having its upper transverse edge 29 spaced somewhat below the edge 27 to form a transverse gap 28' in the rear wall of the receptacle.

The door 28 is movably connected with the short rear wall 14 by a yieldable wire hinge device 30, including an upper transverse section 31, rigidly secured to the outer face of the rear wall 14 by staples 32 or the like. The wire hinge 30 further comprises downwardly and laterally outwardly inclined spring portions 33, integral therewith, and which spring portions span the gap 28', as shown, and have their lower ends terminating near the top and outer edges of the door 28 in U-shaped extensions 34, rigidly anchored to the outer face of the door 28, as by staples 35. The door 28 is provided near its upper edge and at its transverse center with a finger opening 36, to facilitate elevating the door, and the door is further provided near and inwardly of its lower corners with a pair of depending lugs 37, which are engageable within a pair of locking openings 38 formed through the bottom wall 11', just forwardly of the door 28.

The hinge device 30 is spring-tensioned to normally hold the door 28 in the closed position shown in Figures 2 and 4, and the spring portions 33 resiliently urge the door downwardly and forwardly so that the lugs 37 will normally engage the openings 38. To release the door 28, for discharging the fruit from the receptacle 10 into a field box 39 or the like, Figure 9, the operator merely holds the receptacle 10 in a generally vertical position with the door 28 arranged lowermost, and the fingers of one hand engage within the opening 36, there being an additional finger opening 40 formed through the forward wall 22 of the chute 18, at the transverse center of the chute, as shown. With the receptacle held as in Figure 9, the door 28 is elevated against the tension of the spring hinge device 30, and the upper edge 29 of the door shifts toward the edge 27 of the rear wall 14. When this occurs, the lugs 37 will disengage the openings 38, and the weight of the fruit within the receptacle 10 will force the door 28 to swing open and downwardly, as in Figure 9, the door pivoting generally about the axis of the hinge portion 31. However, the portion 31 does not actually turn within the staples 32, which rigidly clamp the wire hinge device, but the elongated diverging spring portions 33 will yield or bend to permit the opening of the door. When the fruit is discharged into the field box 39, the spring hinge device will return the door 28 toward its closed position, and the fruit picker may readily re-engage the locking lugs 37 within the openings 38 to securely close the door. The door will not open unless it is elevated against the tension of the spring portions 33 by the fingers within the opening 36.

Accordingly, when the receptacle 10 is filled with fruit and grasped at the opening 40 and held in a depending position as in Figure 9, the door 28 will remain securely closed and the fruit will not be accidentally dumped during the carrying of the receptacle. The receptacle is normally carried when filled with fruit in the generally vertical position shown in Figure 9, although it may be carried in a more level position, if preferred. In this connection, additional hand openings 41 may be provided through the side walls 21 of the chute, near the longitudinal center of the receptacle 10. These openings 41 are optional and may be omitted if desired, because the receptacle 10 may be manipulated satisfactorily without them. In like manner, additional finger openings 42 may be provided near the leading edge 17 of the inclined wall portion 16 on opposite sides of the brace 24, Figure 3, to facilitate grasping the inclined wall portion 16. It is desirable to grasp the wall portion 16 on some occasions for properly manipulating the receptacle.

The receptacle 10 is supported upon the body during use by a suitable body harness, one preferred form of which is illustrated in Figures 5 through 7. It should be understood however that other preferred types of body harness or suspension means may be adapted to the receptacle as found desirable by the user, and I do not wish to limit the invention to any one type or design of supporting harness.

As shown particularly in Figures 5-7, the supporting harness comprises a pair of loops or shoulder straps 43 which may be adjustable if desired, and which loops receive the arms of the wearer as indicated. At their fronts, the loops are connected by a stiff cross member 44 formed of metal, wood or the like and provided at its longitudinal center with a strap attaching hook 45. A first relatively short strap 46 has an eye 47 at its upper end engageable upon the hook 45, and the length of the strap 46 may be adjustable by conventional means, if preferred, or the strap may have a fixed length. At its lower end, the strap 46 carries a fastener 48 for detachable connection with a ring or eye 49, mounted upon the curved wall portion 15' of the receptacle 10, at the top rear corner of the same and transverse center thereof. If preferred, the strap 46 may be permanently secured at its upper end to the cross member 44 and merely detachably connected with the ring 49 of receptacle 10.

A second elongated strap 50 is provided at its upper end with an eye 51 or the like engageable with the hook 45, and the forward end of strap 50 carries a fastener 52 for detachable engagement with a ring 53, mounted upon the inclined wall portion 16 near its forward edge and at its transverse center. The strap 50 may have its upper end permanently attached to the stiff cross member 44 rather than detachably connected with the hook 45, if preferred.

The strap 50 is provided along its length with two or more additional eyes 54, each engageable with the hook 45 for the purpose of adjusting the length of the strap 50 and thereby adjusting the elevation of the receptacle 10 upon the wearer.

The receptacle 10 is thus suspended by the straps 46 and 50 from the member 44 of the body harness, and the rear wall of the receptacle bears against the body of the wearer as shown in Figure 5. By this arrangement, the receptacle may be supported in a generally level position with the chute 18 extending forwardly of the body for a substantial distance, while the body portion 11 of the receptacle is close to the chest of the wearer.

Due to the flexibility and adjustability of the body harness, the receptacle 10 may assume various desired positions at the front of the wearer, for example, the receptacle may be inclined upwardly as shown in dotted lines in Figure 5 to clear branches and the like when the fruit picker is climbing the ladder. If necessary, the picker can hold the receptacle 10 substantially vertically at the front of his body with the open side of the chute 18 against his chest, and this provides further clearance for climbing the ladder or the like. The receptacle can even be turned crosswise of the body without disconnecting it from the two suspension straps 46 and 50, which straps serve to suspend the receptacle 10 in the normal generally level position indicated in full lines in Figure 5.

The rear sides of shoulder loops 43 are also connected by a transverse strap or member 55, in turn connected to a vertically extending relatively rigid bar 56 which lies adjacent the back of the wearer at the transverse center of the harness and extends vertically above and below the strap 55. The lower end of the bar 56 is forked at 57 for engagement over the belt 58 of the wearer, which belt receives the downward load on the bar 56 and stabilizes the same. At its upper end, somewhat above the shoulder loops 43, the bar 56 carries an upwardly opening hook 59 which is engageable through the forward hand hold 40 of the receptacle chute 18, Figure 7. This enables the fruit picker to suspend and carry a spare receptacle 10 upon his back when desired.

An additional hook 60 is preferably carried by one side of the belt 58 to form a temporary support for the spare receptacle 10 when the latter is removed empty from the hook 59 and must be supported while the filled receptacle 10 at the front of the body is being swung around to the back and hung upon the hook 59. All of this can be done while the fruit picker is on the ladder as in Figure 8, and without necessitating descending the ladder for making the transfer of the two receptacles 10 from front to back as above-described. With this arrangement, the fruit picker may pick twice as much fruit and fill both receptacles 10 without descending the ladder. Of course, if preferred, only one receptacle 10 need be used at a time, in which case the hook 59 of member 56 is not used, as illustrated in Figure 5. Figure 6 also shows in broken lines the spare receptacle 10 suspended from the hook 59 at the back of the wearer.

When two receptacles 10 are used, the overall operation of fruit picking is rendered easier and less fatiguing because the two receptacles and their contents tend to balance the wearer at the front and back.

With the receptacle 10 arranged on the body in the normal operative position shown in full lines in Figure 5 and also in Figure 8, the picker picks the fruit from the branches and deposits it in the chute 18 at any convenient point along the length of the chute. This means that the picker does not have to move the fruit from the point of picking inwardly toward the body each time it is picked but may merely place it directly in the chute 18 below the point of picking, and with the receptacle 10 adjusted to the most convenient elevation. This greatly reduces the manual labor involved, and lessens the tiring of the arms.

If the fruit is being picked directly overhead or near the body, it may be placed upon the inclined wall portion 16 rather than in the chute 18, and this also reduces the work. In either case, the picked fruit will readily roll down the inclined bottom 19 of the chute or down the inclined wall portion 16 to enter the body portion 11 of the receptacle by way of the passage 25. Since the receptacle body portion 11 is relatively shallow below the shoulder 20, the fruit will have only a very slight distance to drop upon entering the box-like body portion through the passage 25, and this will be true regardless of whether the fruit is initially placed in the chute 18 or upon the inclined wall portion 16. The drop from the lower edge 17 of wall portion 16 to the rounded shoulder 20 is very slight, and the fruit will not be bruised when passing from the wall portion 16. Likewise, if the picker takes care to place the lower discharge end of the receptacle 10 well down inside of the box 39 prior to releasing the door 28, Figure 9, the fruit will not be bruised when it enters the field box 39.

The receptacle 10 is spill-proof as previously mentioned. While being carried in a depending vertical position by the hand hold 40, the fruit cannot possibly spill from the body portion 11. If the receptacle has its forward end or chute inclined downwardly, the curved wall 22 and flange 23 will prevent the fruit from spilling until a very extreme downward angle is reached, and due to the arrangement of the hand holds, there is no tendency for the picker to ever carry the receptacle with the forward end of the chute 18 extending vertically downwardly. Even if this were done, and if the body portion 11 were substantially filled with the fruit, little or none would spill because the fruit will jam up in the passage 25 and will not pass forwardly into the chute 18.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A fruit picker's receptacle comprising a box-like body portion having a rear wall provided with an opening, a door normally covering said opening and adapted to be opened for discharging the fruit from the receptacle, a chute carried by the forward side of the boxlike body portion and projecting a substantial distance forwardly thereof and having its top open and including an inclined bottom wall joined to the forward wall of said body portion near the vertical center of the body portion, and an inclined top wall extension upon the body portion projecting into said chute and having a leading edge spaced below the open top of the chute and spaced above the bottom of the chute near said forward wall of the body portion, said inclined top wall extension forming with the bottom wall of the chute a restricted passage between the chute and box-like body portion.

2. A fruit picker's receptacle comprising a box-like body portion, discharge opening means for said body portion, an elongated chute carried by the body portion near the top of the same and extending forwardly thereof and having its top open, said chute communicating with the body portion near the forward side of the body portion, and a top wall extension on the body portion projecting into said chute and forming with the bottom wall of the chute a passage leading into the body portion a substantial distance below the top of the body portion.

3. A fruit picker's receptacle comprising a hollow body portion adapted to receive a substantial quantity of fruit, discharge door means on one side of said body portion, a relatively shallow open top chute carried by the body portion near the top of the body portion and extending forwardly thereof and having an inclined bottom joined with the forward wall of the body portion intermediate the top and bottom of the body portion, and an inclined top wall extension for the body portion projecting into the rear portion of said chute and having a leading edge disposed intermediate the open top of the chute and the inclined bottom wall thereof.

4. A fruit picker's receptacle comprising a box-like body portion including a top wall having a downwardly inclined portion including a leading edge, said body portion including a relatively low forward wall arranged generally in alignment with said leading edge and terminating a substantial distance below said leading edge to form therewith a restricted passage in the forward side of the body portion intermediate the top and bottom of the body portion, and an elongated forwardly projecting chute carried by the body portion and having an open top and a bottom wall connected with said forward wall of the body portion, said restricted passage communicating with said chute and with the interior of the body portion.

5. A fruit picker's receptacle according to claim 4, and padding secured to the upper marginal edge of said chute to prevent bruising of the fruit when the same is introduced into the chute.

6. A fruit picker's receptacle according to claim 4, and wherein the chute is provided near its forward end with an opening to facilitate holding the receptacle in a vertical position with said body portion arranged lowermost.

7. A fruit picker's receptacle according to claim 4, and manually releasable normally locked discharge door means for the rear side of the body portion remote from said chute.

References Cited in the file of this patent

UNITED STATES PATENTS

| | | |
|---|---|---|
| 1,111,937 | Zoulek | Sept. 29, 1914 |
| 1,505,487 | Park | Aug. 19, 1924 |
| 1,542,163 | Morde | June 16, 1925 |
| 2,712,335 | Houldsworth | July 5, 1955 |
| 2,734,542 | Galland | Feb. 14, 1956 |

FOREIGN PATENTS

| | | |
|---|---|---|
| 901,772 | France | Aug. 6, 1945 |